United States Patent [19]

Knibbe et al.

[11] 4,038,894
[45] Aug. 2, 1977

[54] PIERCING APPARATUS

[75] Inventors: Jan C. Knibbe, Detroit; Willard J. McPhee, Bloomfield Hills, both of Mich.

[73] Assignee: Springfield Tool and Die, Inc., Dearborn, Mich.

[21] Appl. No.: 596,995

[22] Filed: July 18, 1975

[51] Int. Cl.² .............................................. B26F 1/02
[52] U.S. Cl. ................................. 83/411 R; 83/267; 83/527; 83/260; 269/57
[58] Field of Search ................. 83/267, 411 R, 240, 83/527, 560; 269/57; 408/71

[56] References Cited

U.S. PATENT DOCUMENTS

| 2,227,835 | 1/1941 | Kelsh et al. | 83/411 R |
| 2,740,973 | 4/1956 | Borner et al. | 408/71 X |
| 2,758,652 | 8/1956 | Novinger et al. | 83/137 X |
| 3,336,823 | 8/1967 | Bonzi | 408/71 |
| 3,698,273 | 10/1972 | Richard et al. | 83/267 X |
| 3,835,744 | 9/1974 | Wendt | 83/411 R |

Primary Examiner—J. M. Meister
Attorney, Agent, or Firm—Gifford, Chandler, Sheridan & Sprinkle

[57] ABSTRACT

Apparatus for piercing an arcuate workpiece includes a frame, an index table rotatably mounted on the frame, piercing means horizontally adjustable on the frame with respect to the index table and a punch head movable horizontally into engagement with the workpiece mounted to the index table. A swivel clamping mechanism detachably mounts the workpiece to the index table.

5 Claims, 4 Drawing Figures

PIERCING APPARATUS

BACKGROUND OF THE INVENTION

I. Field of the Invention

The present invention relates to piercing apparatus and more particularly to such an apparatus including a horizontally movable piercing means for piercing an arcuate workpiece.

II. Description of the Prior Art

Heretofore the removal of portions of arcuate workpieces has required a difficult and expensive machining operation. This has in the past taken the form of essentially hand machining each section to be removed. This, of course, is very expensive and, where a number of machining operations are by reason of required on each workpiece, results in substantial waste losses caused by improper machining of one portion when other portions have been completed.

Some efforts have in the past been made to machine such parts by electrical discharge machining (EDM) or electrical-chemical machining (ECM) but for a number of reasons these methods are not entirely satisfactory.

Because of these difficulties the fabrication of turbine or rotor wheels for instance has heretofore been accomplished by joining the blades to the arcuate rotor or turbine without the aid of locating apertures or slots. Since such blades must be precisely located and properly oriented, fixing them while welding or a similar joining operation is performed is very difficult.

SUMMARY OF THE PRESENT INVENTION

The present invention provides an apparatus for automatically piercing an arcuate workpiece such as a turbine, a rotor or the like and indexing the workpiece to a new position to be pierced again. This method eliminates the need for hand machining, EDM, ECM or the like and permits a turbine or rotor to be produced by providing accurately positioned and dimensioned slots for receiving and locating the turbine blades.

A frame is provided which supports a piercing means including a horizontally operable punch assembly and a die assembly. The workpiece is mounted to a rotatable index table and is indexed to successive positions intermediate the punch assembly and the die assembly.

Means are provided for moving the entire piercing means horizontally along the frame and with respect to the index table so that the apparatus can accommodate workpieces of different diameters.

DESCRIPTION OF THE DRAWINGS

The present invention will be more apparent upon reference to the following description which refers to the enclosed drawings in which like reference characters refer to like parts throughout the several views and in which.

DESCRIPTION OF A PREFERRED EMBODIMENT

Figure 1:
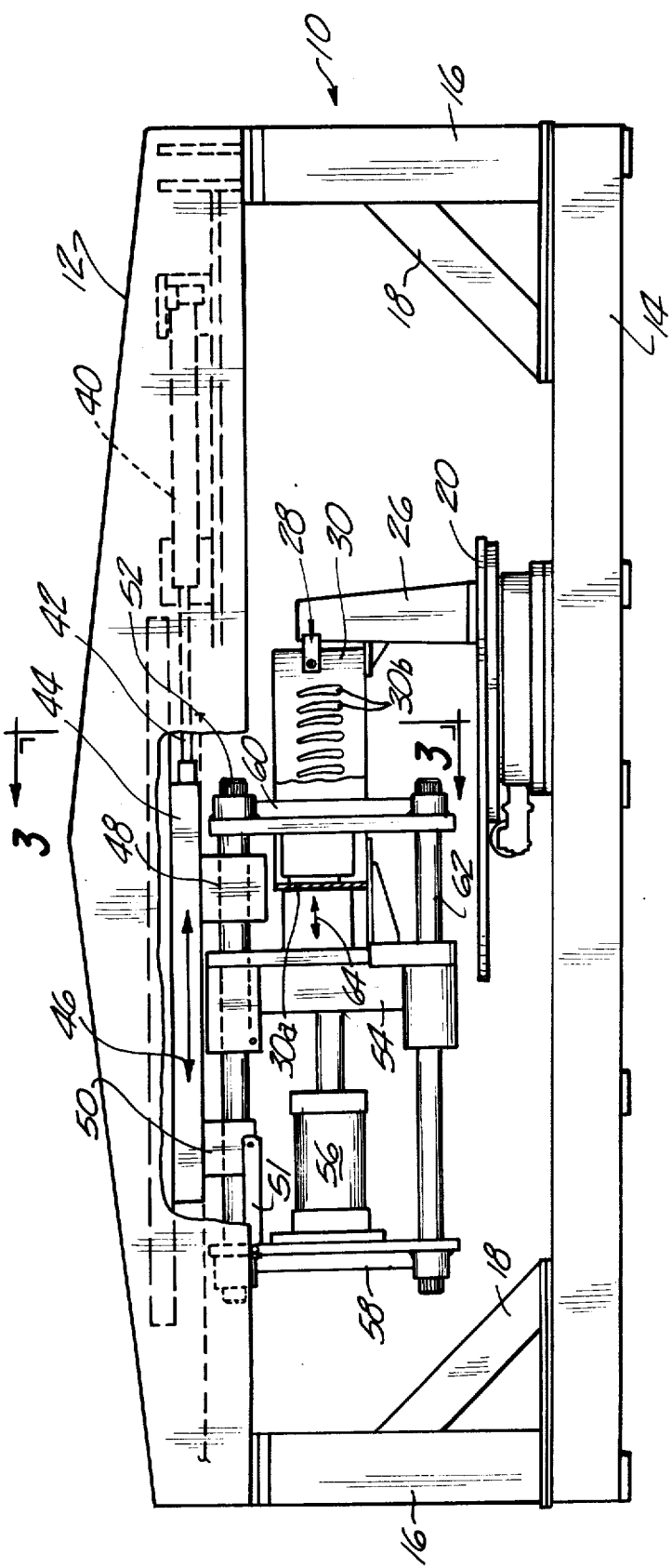
FIG. 1 is a side elevational view of the apparatus of the present invention with portions removed for purposes of clarity.
Figure 2:
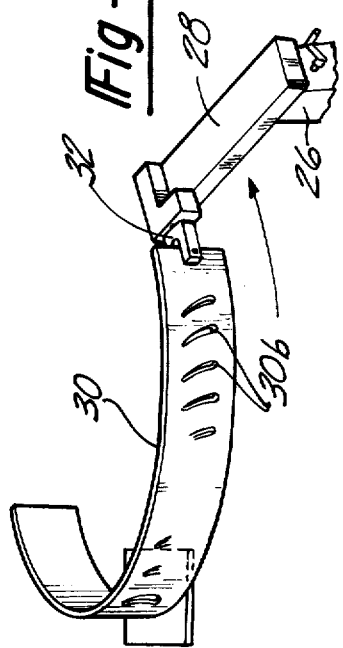
FIG. 2 is a fragmentary view of a portion of the apparatus shown in FIG. 1 but illustrating the apparatus in perspective and enlarged somewhat for purposes of clarity.

Now referring to the drawings for a more detailed description of the present invention, FIG. 1 illustrates a preferred embodiment as comprising a frame assembly 10 including substantially rectangular upper and lower members 12 and 14 respectively joined by vertical uprights 16 joining the corners of the upper and lower members 12 and 14. Braces 18 extending between the uprights 16 and the lower member 14 add to the rigidity of the frame assembly 10.

An index table 20 is mounted to the lower member 14 of the frame assembly 10. The table 20 is rotatably mounted to the lower member 14 and is indexable to rotated positions as indicated by the arcuate arrow 34 in FIG. 4, by conventional means (not shown).

Figures 3, 4:
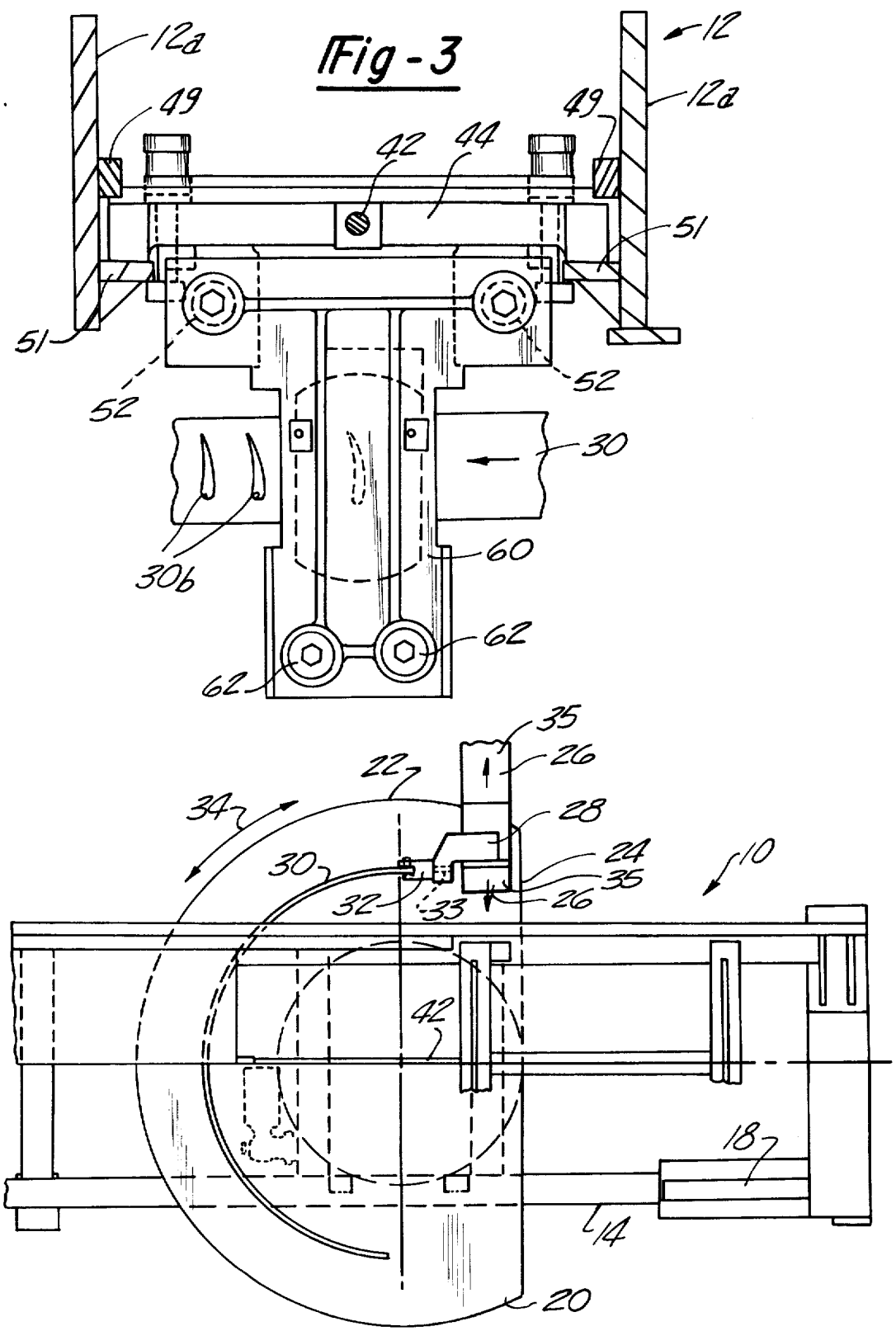
FIG. 3 is a view as seen substantially from line 3—3 of FIG. 1 and enlarged somewhat for purposes of clarity.
FIG. 4 is a view as seen substantially from line 4—4 of FIG. 1 and enlarged somewhat for purposes of clarity.

As can best be seen in FIG. 4, the index table 20 is provided with an arcuate edge 22 and a straight edge 24. A workpiece holder 26 extends upright from the top of the index table 20 on one side thereof adjacent the juncture of the arcuate edge 22 and the straight edge 24 of the table 20.

A clamp assembly 28 is mounted adjacent the upper end of the workpiece holder 26 and provides the means for mounting an arcuate workpiece 30 to the index table 20. The clamp assembly 28 is movable horizontally with respect to the holder 26 as indicated by the arrows 35 in FIG. 4 to permit the accommodation of workpieces of different diameters. The workpiece engaging portion 32 is pivotally mounted by pin 33 to the remainder of the clamp assembly 28 so that it swivels to securely retain the workpiece 30 as the index table 20 is rotated in the direction of the arrow 34 in FIG. 4.

As can best be seen in FIG. 1, a cylinder 40 is fixed in the upper member 12 and has its rod 42 secured to a support 44 slidably mounted in the upper member 12 so that extension and retraction of the rod 42 produces movement of the support 44 in the direction of the arrows 46. Suitable means (not shown) are provided for actuating the cylinder 40.

As can best be seen in FIG. 3, the support 44 is slidable in upper and lower ways 49 and 51 respectively which are formed in the interior of side walls 12a of the upper member 12.

Referring again to FIG. 1 downwardly extending forward and rear support blocks 48 and 50 respectively are fixed to the slidable support 44 and are movable therewith. Upper bars 52 extend through the support blocks 48 and 50.

As can best be seen in FIGS. 1 and 3 a punch assembly 54 is slidably carried on the bars 52 and is actuated by a cylinder 56 having one end mounted to a plate 58 fixed to the bars 52. A die assembly 60 is fixedly mounted to the forward end of the bars 52. Lower bars 62 extend through the plate 58, the punch assembly 54, and the die assembly 60 to more securely tie the various components together. The plate 58 is tied to the rear support block 50 by a bar 51 so that movement of the support 44 in the direction of the arrows 46 produces corresponding movement of the bars 52, the support plate 58 and the die assembly 60.

The cylinder 56 is selectively operable to actuate the punch assembly 54 in the direction of the arrows 64 (FIG. 1) to bring the punch assembly 54 into and out of engagement with the portion 30a of the workpiece 30 positioned between the punch assembly 54 and the die assembly 60 to remove appropriate portions 30b of the workpiece 30. The punch assembly 54 and the die assembly 60 are provided with suitable tooling as is conventional (not shown) to accomplish this function.

To utilize the piercing apparatus of the present invention a workpiece 30 is mounted to the clamp 28 of the holder 26. The clamp 28 is then adjusted to align the center of the workpiece 30 with the center of the index table 20. The cylinder 40 is then actuated to move the punch assembly 54 and the die assembly 60 to the proper position for receiving the workpiece 30 therebetween.

The cylinder 56 is then actuated to move the punch assembly 54 into piercing engagement with the workpiece 30 to form the first slot 30b. The table 20 is then indexed to the next position and the operation is repeated until piercing has been accomplished along the entire periphery of the workpiece 30.

The swivelly mounted clamp assembly 28 provides a means for pulling or pushing (depending upon the direction of movement of the index table 20) the workpiece 30 to each new position without producing undue strain on either the clamp assembly 28 or the workpiece 30.

Means are provided to readily accommodate workpieces through a wide range of sizes and the piercing of workpieces as provided by the present invention eliminates heretofore used expensive machining processes and permits turbine assemblies to be manufactured in a new and more economical manner.

It should be apparent that although apparatus has been described for piercing a workpiece with slight modifications and without departing from the intended scope of the invention other work could be performed upon a workpiece as well.

It is also apparent that although a single embodiment of the present invention has been described many changes and modifications can be made without departing from the spirit of the invention as expressed by the scope of the appended claims:

We claim:

1. Apparatus for performing work on a workpiece, said apparatus comprising:
   a frame,
   an index table mounted on said frame, said table being selectively rotatable about an axis;
   means for mounting said workpiece to said table comprising a holder extending upwardly from said table near one edge thereof and a clamp carried at the upper end thereof for releasably engaging one portion of said workpiece, said clamp being swivelly mounted to said holder and
   work performing means mounted to said frame and including a portion selectively movable in a direction substantially perpendicular to the axis of rotation of said index table to perform work on said workpiece in a different location at each rotated position of said table.

2. The apparatus as defined in claim 1 and in which the entire work performing means is movable as a unit toward and away from said table to accommodate different size workpieces.

3. The apparatus as defined in claim 1 and in which said work performing means comprises a punch assembly and a die assembly, and means selectively moving said punch assembly with respect to said die assembly into and out of engagement with said workpiece.

4. The apparatus as defined in claim 3 and in which said last mentioned means comprises a cylinder operatively connected to said punch assembly.

5. The apparatus as defined in claim 3 and including means for selectively moving said punch assembly and said die assembly together in a direction substantially perpendicular with respect to the axis of rotation of said index table to accommodate workpieces of different sizes.

* * * * *